(12) United States Patent
Sprinzl

(10) Patent No.: US 11,447,179 B2
(45) Date of Patent: Sep. 20, 2022

(54) METHOD FOR DETERMINING THE RACK-AND-PINION POSITION IN A STEERING SYSTEM HAVING AN ELECTRIC SERVOMOTOR

(71) Applicant: Robert Bosch GmbH, Stuttgart (DE)

(72) Inventor: Michael Sprinzl, Süßen (DE)

(73) Assignee: Robert Bosch GmbH, Stuttgart (DE)

( * ) Notice: Subject to any disclaimer, the term of this patent is extended or adjusted under 35 U.S.C. 154(b) by 599 days.

(21) Appl. No.: 16/464,392

(22) PCT Filed: Dec. 6, 2017

(86) PCT No.: PCT/EP2017/081683
§ 371 (c)(1),
(2) Date: May 28, 2019

(87) PCT Pub. No.: WO2018/108668
PCT Pub. Date: Jun. 21, 2018

(65) Prior Publication Data
US 2021/0114658 A1    Apr. 22, 2021

(30) Foreign Application Priority Data
Dec. 16, 2016 (DE) ..................... 10 2016 225 253.4

(51) Int. Cl.
*B62D 15/02* (2006.01)
*B62D 3/12* (2006.01)
*B62D 5/04* (2006.01)
*B62D 6/00* (2006.01)

(52) U.S. Cl.
CPC .............. *B62D 15/02* (2013.01); *B62D 3/12* (2013.01); *B62D 5/0424* (2013.01); *B62D 6/00* (2013.01)

(58) Field of Classification Search
CPC ........ B62D 15/02; B62D 3/12; B62D 5/0424; B62D 6/00
See application file for complete search history.

(56) References Cited

U.S. PATENT DOCUMENTS 5,659,472 A    8/1997  Nishino et al.
6,175,793 B1   1/2001  Ironside
(Continued)

FOREIGN PATENT DOCUMENTS

CN    102019956 A    4/2011
CN    102023027 A    4/2011
(Continued)

OTHER PUBLICATIONS

International Search Report corresponding to PCT Application No. PCT/EP2017/081683, dated Apr. 16, 2018 (German and English language document) (8 pages).

*Primary Examiner* — Peter D Nolan
*Assistant Examiner* — Demetra R Smith-Stewart
(74) *Attorney, Agent, or Firm* — Maginot, Moore & Beck LLP

(57) ABSTRACT

A method for determining a rack-and-pinion position in a steering system having an electric servomotor and a rack includes determining kinematic changes in a transmission path between the servomotor and the rack. The method further includes generating an event signal when a kinematic or dynamic rotor size of the servomotor exceeds an assigned threshold value.

14 Claims, 2 Drawing Sheets

(56) References Cited

U.S. PATENT DOCUMENTS

| | | | | |
|---|---|---|---|---|
| 8,862,325 B2* | 10/2014 | Soos | ................. | B62D 15/0235 |
| | | | | 701/41 |
| 9,272,732 B2* | 3/2016 | Greul | ................. | B62D 15/0225 |
| 2009/0033259 A1* | 2/2009 | Cesario | .................. | H02P 21/24 |
| | | | | 318/400.04 |
| 2012/0330509 A1* | 12/2012 | Kornhaas | ................ | B62D 5/04 |
| | | | | 701/41 |
| 2015/0298722 A1* | 10/2015 | Witte | ...................... | B62D 5/04 |
| | | | | 180/407 |

FOREIGN PATENT DOCUMENTS

| | | | | |
|---|---|---|---|---|
| CN | 102905954 A | | 1/2013 | |
| CN | 103863385 A | | 6/2014 | |
| CN | 105644617 A | | 6/2016 | |
| DE | 197 03 903 A1 | | 8/1998 | |
| DE | 102006046834 A1 | * | 4/2008 | ......... B62D 15/0245 |
| DE | 10 2006 052 092 A1 | | 5/2008 | |
| DE | 10 2010 062 577 A1 | | 6/2012 | |
| DE | 10 2012 012 386 A1 | | 12/2013 | |
| JP | H08-080080 A | | 3/1996 | |
| JP | 2000-203443 A | | 7/2000 | |
| JP | 2006-036146 A | | 2/2006 | |
| JP | 2006-123663 A | | 5/2006 | |
| JP | 2008-105604 A | | 5/2008 | |
| JP | 2009-096325 A | | 5/2009 | |
| JP | 2014-125204 A | | 7/2014 | |
| JP | 2015-157612 A | | 9/2015 | |
| KR | 2012-0082604 A | | 7/2012 | |
| KR | 20160077037 A | * | 7/2016 | ............. H02K 7/116 |
| WO | WO-2014145018 A2 | * | 9/2014 | ............. H02K 11/33 |

* cited by examiner

METHOD FOR DETERMINING THE RACK-AND-PINION POSITION IN A STEERING SYSTEM HAVING AN ELECTRIC SERVOMOTOR

This application is a 35 U.S.C. § 371 National Stage Application of PCT/EP2017/081683, filed on Dec. 6, 2017, which claims the benefit of priority to Ser. No. DE 10 2016 225 253.4, filed on Dec. 16, 2016 in Germany, the disclosures of which are incorporated herein by reference in their entirety.

BACKGROUND

The disclosure relates to a method for determining the rack-and-pinion position in a steering system having an electric servomotor.

A steering system in a vehicle having an electric servomotor for assisting the steering movement is disclosed in DE 10 2010 062 577 A1. The servo torque of the servomotor may be transmitted, for example, via a gear mechanism to a rack of the steering system which adjusts the steerable wheels of the vehicle.

Steering angle sensors are also known for detecting the current steering angle of the steering shaft which is adjusted by the driver via the steering wheel. According to DE 197 03 903 A1 a permanent magnet is fastened to the steering shaft, a sensor which is sensitive to a magnetic field being assigned thereto on the housing side and when the steering shaft rotates being able to record the change in the magnetic field so that information may be obtained relative to the steering angle.

SUMMARY

The method according to the disclosure may be used in steering systems of vehicles which are provided with an electric servomotor, an assisting servo torque being able to be introduced thereby into the steering system. Various basic functionalities may be represented thereby. Firstly, driver-based driving may be implemented, in which an electrical servo torque is introduced into the steering system for assisting the manual torque generated by the driver and applied via the steering wheel (power assistance). Secondly, by means of the electric servomotor automatic driving may be implemented, in which a rack of the steering system is automatically adjusted by the servo torque of the electric servomotor and a desired rack-and-pinion position is set in order to generate thereby via the vehicle axle a wheel steering angle on the steerable wheels of the vehicle (rack-and-pinion position adjustment). By means of the method according to the disclosure, the rack-and-pinion position in the steering system having an electric servomotor may be determined by taking into account kinematic changes in the transmission path between the servomotor and the rack, in particular in a gear mechanism between the servomotor and the rack.

The steering system comprises a steering shaft and/or spindle which is actuated by the driver via the steering wheel and is kinematically coupled to the rack via a steering pinion so that in the case of a steering movement the rack performs an axial adjusting movement which is converted into the desired wheel steering movement of the steerable wheels. The servomotor is kinematically coupled to the rack so that the rotor movement of the servomotor takes place synchronously with the axial movement of the rack. Advantageously, a gear mechanism is located between the electric servomotor and the rack, the gear input shaft thereof being kinematically coupled to the rotor and the gear output shaft thereof being kinematically coupled to the rack. The rack-and-pinion position may be determined on the basis of the measured rotor position. To this end, a known absolute position is required for the initialization.

In the method according to the disclosure, a kinematic and/or a dynamic rotor size of the rotor of the servomotor are analyzed in terms of an assigned threshold value being exceeded. If the threshold value is exceeded, an event signal is generated. By means of this method it is ensured that the steering movement is assisted in the correct manner via the electric servomotor. In particular, malfunctions when transmitting the servo torque from the servo motor to the rack, which have an effect on the detection of the rack-and-pinion position, may be detected.

For example, an angular offset between an input shaft and an output shaft of the gear mechanism between the electric servomotor and the rack may be determined, whereby the relative position between the rotor of the servomotor and the rack is changed. In rare cases this occurs inside the gear mechanism, for example when activating a friction clutch or in the case of slip inside the transmission path or in the coupling between the rotor of the servomotor and the gear mechanism or between the gear mechanism and the rack. If such an offset occurs, the absolute rack-and-pinion position is no longer accurately known, whereby problems with the rack-and-pinion position adjustment, which in particular forms the basis of automatic driving, may occur.

With correct operation in the steering system, the rack-and-pinion position is generally determined by a rotor position sensor for detecting the rotor position of the servomotor. From this relative information, after initialization, an absolute rack-and-pinion position may be determined by means of an index sensor on the steering shaft or the steering pinion. With each revolution of the steering shaft the index sensor delivers at defined points index signals which may be used in order to validate the relation. During operation, the information of the rotor position sensor is thus sufficient for detecting the current rotor position of the servomotor in order to determine the absolute rack-and-pinion position.

However, if an offset occurs, for example, between the input shaft and the output shaft of the gear mechanism between the servomotor and the rack, the absolute rack-and-pinion position, which is solely based on the rotor position, is no longer known with sufficient accuracy. This case may be detected by means of the method according to the disclosure by a kinematic or dynamic rotor size of the servomotor being analyzed in terms of an assigned threshold value being exceeded. If the threshold value is exceeded, a critical event has to be assumed, resulting in the above-described offset, for example between the input shaft and the output shaft of the gear mechanism, whereupon an event signal which indicates the critical situation is generated. The kinematic and/or dynamic rotor size, in the case of the assigned threshold value being exceeded, indicates that an offset has occurred in the transmission path between the electric servomotor and the rack and that the absolute rack-and-pinion position is no longer able to be clearly identified.

The rotor size under consideration may be either a kinematic variable or a dynamic variable. The kinematic rotor size, for example, is the rotational speed of the rotor, optionally also the rotational acceleration of the rotor, wherein the rotational speed of the rotor and the rotational acceleration of the rotor may be determined on the basis of the current rotor position which is detected by means of the rotor position sensor. For example, in the case of slip in a clutch between the input and output shaft in the gear mechanism, the rotational speed of the rotor adopts a value which exceeds an assigned threshold value, whereupon the event signal is generated. Additionally or alternatively, the rotational acceleration of the rotor may also be considered when a threshold value is exceeded.

For example, the motor torque generated in the electric servomotor may be considered as the dynamic rotor size which is transmitted via the rotor. Sudden changes to the motor torque may be determined by monitoring if the value exceeds and/or falls below the assigned threshold value and indicate an error, such as for example slip in a clutch in the gear mechanism, whereupon an event signal is generated. The motor torque may be measured directly via a torque sensor or determined indirectly from physical interactions, in particular from a measurement of the motor current of the electric servomotor.

Within the meaning of the disclosure, exceeding a threshold value means both a rise above an upper threshold value and a fall below a lower threshold value.

According to a further advantageous embodiment, the event signal is used so that the activation of automatic driving is prevented. In this embodiment, the disclosure relates to a method for controlling a steering system which operates automatically and which is constructed in the above-described manner, wherein a malfunction in the rack-and-pinion position detection leads to the event signal preventing the activation of automatic driving.

Within the specified field of automatic driving, generally event signals do not have to be taken into account. However, if the steering system is operated outside the specified field, it may be expedient if an event signal, which occurs during automatic driving, does not lead to the stoppage of the automatic driving. In this embodiment, the disclosure relates to self-operating, automatic driving with a corresponding activation of the electric servomotor in the above-described steering system and continuous monitoring for determining a malfunction in the detection of the rack-and-pinion position. If during automatic driving a critical event occurs, which leads to a malfunction in the detection of the rack-and-pinion position, it may nevertheless be advantageous to continue initially with automatic driving for safety reasons and to perform the transition to driver-based driving in the correct manner.

According to a further expedient embodiment, the monitoring of the kinematic and/or dynamic rotor size of the servomotor may be carried out by using one or more phase currents which is and/or are received by the servomotor. The servomotor is expediently activated via a control device which is provided with software and a power unit, wherein the level of phase current in the control device is known.

The disclosure further relates to a control device which is configured in a suitable manner for carrying out the above-described method. Moreover, the disclosure relates to a steering system which is configured in the above-described manner and also comprises a control device in which the above-described method steps are carried out and by which the electric servomotor is activated.

Phase currents controlling the servomotor are generated in the control device, said phase currents being generated on the basis of the variables detected by sensor. Advantageously, the variables detected by sensor are firstly sensor signals of a rotor position sensor and secondly sensor signals of an index sensor on the steering shaft or the steering pinion for detecting the steering shaft revolution. In the driver-controlled operating mode the servomotor is activated on the basis of the measured manual torque of the driver.

According to a further expedient embodiment, the event signal may be deleted and/or canceled again if after further deflection of the index position of the steering shaft it is determined that no offset is present between the input shaft and the output shaft of the gear mechanism.

DETAILED DESCRIPTION

Figure 1:
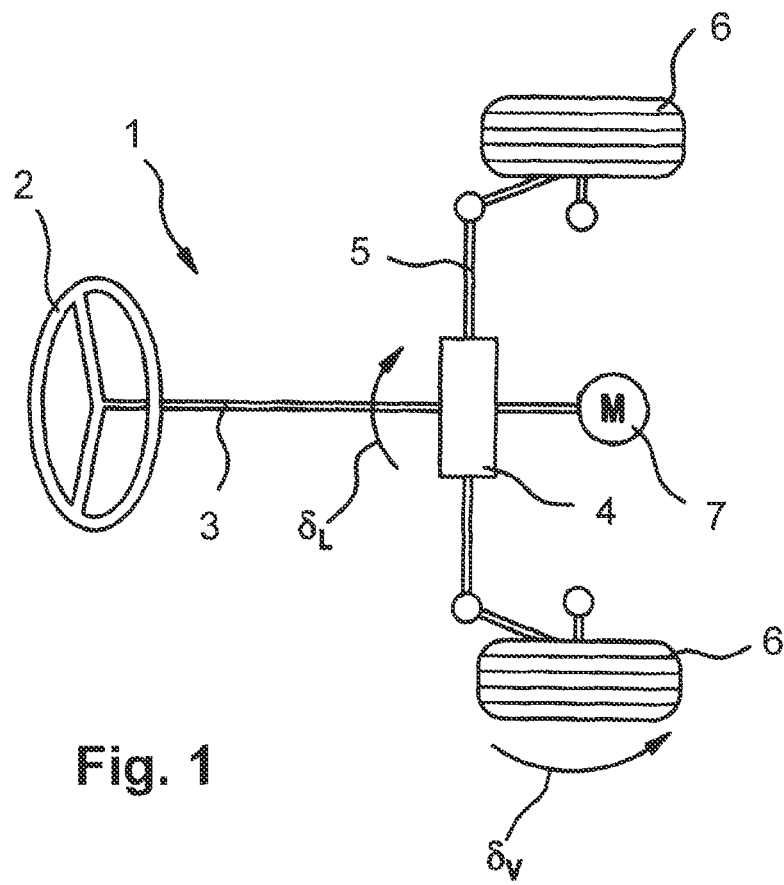
FIG. 1 shows a schematic view of a steering system in a vehicle.

The same components are provided with the same reference numerals in the figures.

In FIG. 1 a steering system 1 with a steering wheel 2, a steering shaft 3 and a steering housing 4 with a rack 5 received therein is shown, the steering movement of the driver being transmitted thereby to the steerable wheels of the vehicle. Via the steering wheel 2, which sits fixedly in terms of rotation on the steering shaft 3, the driver sets the steering angle $\delta_L$ which is transmitted via a steering pinion into an adjusting movement of the rack 5. Subsequently, the wheel steering angle $\delta_V$ is adjusted on the steerable wheels 6.

An electric servomotor 7 serves for assisting the manual torque applied by the driver, a servo torque being able to be introduced thereby into the steering system 1. The servomotor 7 may also be automatically activated for implementing automatic driving and independently of the manual torque of the driver. In this case, the steering movement is generated solely by the servo torque of the servomotor 7.

Figure 2:
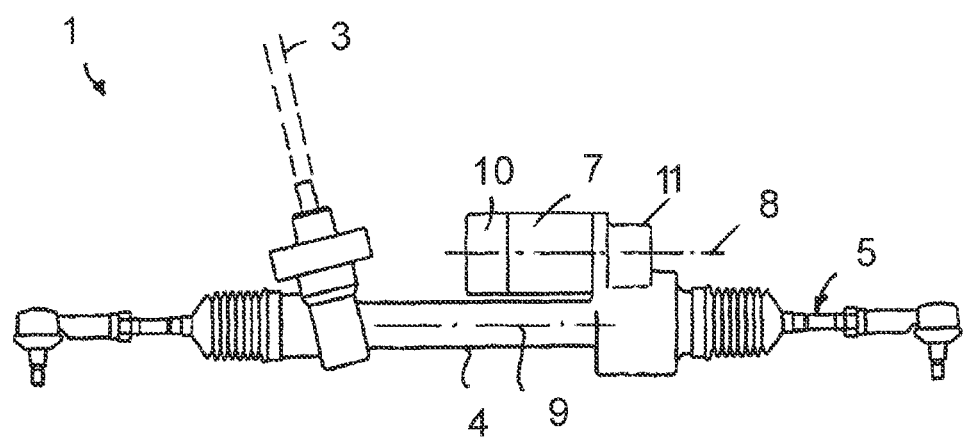
FIG. 2 shows a view of the steering system having the electric servomotor in an axially parallel arrangement relative to a rack of the steering system.

As may be derived from FIG. 2, by way of example the electric servomotor 7 is arranged so as to be axially parallel to the rack 5. The servomotor 7 is flanged onto the steering housing 4, wherein the motor longitudinal axis 8 of the servomotor 7 extends parallel to the longitudinal axis 9 of the rack 5, which is adjusted by the steering shaft 3 in a translatory manner along the longitudinal axis 9. The drive movement of the rotor of the electric servomotor 7 is transmitted as an assisting movement to the rack 5. A control device 10 is assigned to the servomotor 7, the activation of the motor of the servomotor 7 being carried out thereby.

A gear mechanism 11 is arranged between the electric servomotor 7 and the rack 5, the assisting movement of the electric servomotor 7 being transmitted thereby to the rack 5. The gear housing of the gear mechanism 11 is connected to the steering housing 4.

In a preferred embodiment, a rotor position sensor is assigned to the electric servomotor 7, the rotor position of the rotor of the servomotor being able to be detected thereby. Moreover, the steering shaft 3, or a steering pinion which sits on the steering shaft 3 and via which the steering movement is transmitted into a translatory adjusting movement of the rack 5, is provided with a steering wheel angle sensor and with an index sensor, which at known defined positions generates an index signal in the case of a complete revolution of the steering shaft. Thus the interaction between the input shaft and the output shaft of the gear mechanism is detected.

Figure 3:
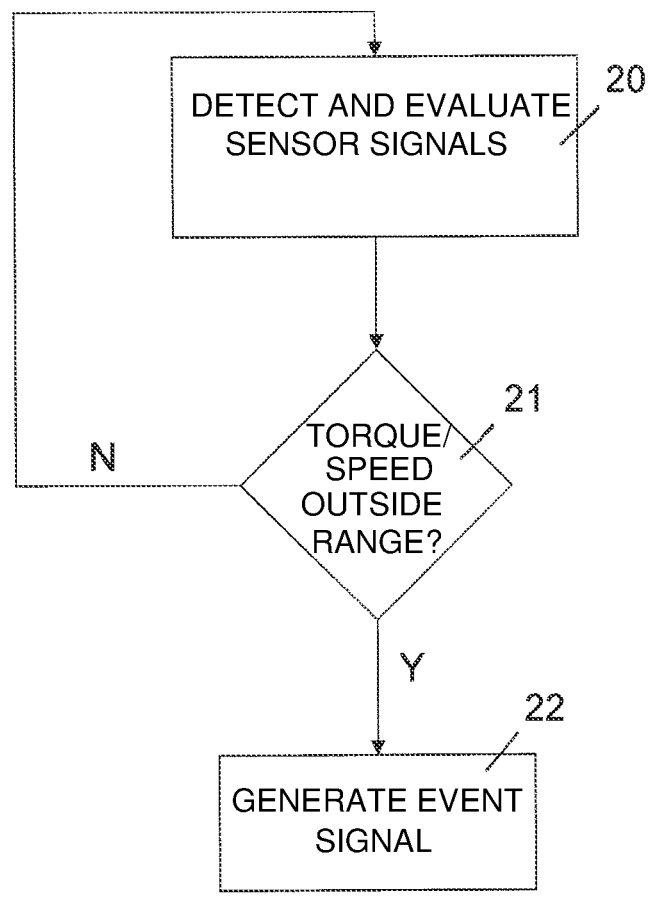
FIG. 3 shows a flow diagram with method steps for determining a malfunction in the detection of the rack-and-pinion position.

FIG. 3 shows a flow diagram having different method steps, a malfunction in the detection of the rack-and-pinion position being able to be determined thereby and an event signal being able to be generated thereby.

In a first method step 20, the sensor signals of the steering system are continuously detected and evaluated, in particular the signals of the rotor position sensor, the manual torque sensor and the signals of the index sensor. Based on the signals, the phase currents for activating the electric servomotor are generated in the control device.

In the next method step 21 an enquiry is made as to whether the motor torque generated by the electric servomotor and/or the rotational speed of the rotor in the servomotor are outside the assigned value ranges. This case occurs, for example, in critical situations in gear mechanisms between the electric servomotor and the rack, wherein the gear mechanism, for example, may be provided with a slip clutch and in the case of a critical situation the slip clutch slips. This situation may be detected from the path of a kinematic and/or dynamic rotor size. In the case of the rotational speed of the rotor which may be determined from the sensor signals of the rotor position sensor, a clutch which is slipping indicates a sudden change in the load applied to the servomotor, whereupon the rotational speed of the rotor also changes, which may be detected using the comparison with an assigned threshold value in the method step 21.

Additionally or alternatively, the motor torque of the servomotor may also be considered. If the slip clutch slips and, as a consequence thereof, a load on the servomotor changes, the motor torque also changes and falls below and/or exceeds an assigned threshold value. The motor torque may, in particular, be detected using the phase current in the control device since the motor torque may be determined from the phase current.

If the query in step 21 results in a kinematic or dynamic rotor size being within the permitted value range, following the No-branch ("N") a return is made to step 20 and step 20 may be carried out again at cyclical intervals.

However, if the query in step 21 results in the considered kinematic and/or dynamic rotor size being outside the permitted value range, following the Yes-branch ("Y") an advance is made to the next step 22 in which an event signal is generated. In the case of driver-based driving, the event signal prevents the activation of automatic driving. If, however, automatic driving is already active and the event signal has been generated during automatic driving, the automatic driving is not stopped but advantageously an ordered transition to driver-based driving is initiated.

LIST OF REFERENCE NUMERALS

1 Steering system
2 Steering wheel
3 Steering shaft
4 Gear housing
5 Rack
6 Front wheel
7 Electric servomotor
8 Motor longitudinal axis
9 Longitudinal axis of rack 5
10 Control device
11 Gear mechanism

The invention claimed is:

1. A method for determining a rack-and-pinion position in a steering system having an electric servomotor and a rack, the method comprising:
   determining kinematic changes in a transmission path between the servomotor and the rack;
   generating an event signal when a kinematic or dynamic rotor size of the servomotor exceeds an assigned threshold value; and
   preventing an activation of automatic driving of a vehicle including the steering system due to the event signal.

2. The method as claimed in claim 1, further comprising: detecting a rotor position of the servomotor via a rotor position sensor.

3. The method as claimed in claim 1, further comprising: detecting a steering shaft revolution via an index sensor on a steering shaft or a steering pinion of the steering system.

4. The method as claimed in claim 1, wherein:
   a gear mechanism is arranged between the servomotor and the rack; and
   the event signal indicates an offset between an input shaft and an output shaft of the gear mechanism.

5. The method as claimed in claim 4, further comprising: indexing of a steering shaft; and
   deleting the event signal when, after the indexing, it is determined that no offset is present between the input shaft and the output shaft of the gear mechanism.

6. The method as claimed in claim 1, wherein a considered rotor size is a rotational speed of a rotor of the servomotor.

7. The method as claimed in claim 1, wherein a considered rotor size is a motor torque transmitted via a rotor of the servomotor.

8. The method as claimed in claim 1, wherein the event signal occurring during the automatic driving does not lead to an immediate stoppage of the automatic driving.

9. The method as claimed in claim 1, further comprising: monitoring a kinematic and/or dynamic rotor size of the servomotor using a phase current of the servomotor.

10. The method of claim 1, wherein a control device is configured to carry out the method.

11. The method of claim 1, further comprising:
    determining, prior to generating the event signal, an absolute rack-and-pinion position using a rotor position sensor configured to detect a rotor position of the servomotor, wherein
    the event signal indicates that an offset has occurred in the transmission path between the electric servomotor and the rack, and that the absolute rack-and-pinion position cannot be clearly determined.

12. A steering system comprising:
    an electric servomotor;
    a rack;
    a control device configured to:
      determine kinematic changes in a transmission path between the servomotor and the rack; and
      generate an event signal when a kinematic or dynamic rotor size of the servomotor exceeds an assigned threshold value;
    a steering shaft kinematically coupled to the rack; and
    a gear mechanism configured to introduce a servo torque onto the rack.

13. The steering system of claim 12, wherein the control device is further configured to:
    determine, prior to generating the event signal, an absolute rack-and-pinion position using a rotor position sensor configured to detect a rotor position of the servomotor, wherein the event signal indicates that an offset has occurred in the transmission path between the electric servomotor and the rack, and that the absolute rack-and-pinion position cannot be clearly determined.

14. A method for determining a rack-and-pinion position in a steering system having an electric servomotor, a steering shaft kinematically coupled to a rack, and a gear mechanism configured to introduce a servo torque onto the rack, the method comprising:
- evaluating at least one signal of at least one of a rotor position sensor of the electric servomotor and a torque sensor of the electric servomotor with a control device;
- identifying the evaluated at least one signal as associated with a rotational speed of a rotor of the electric servomotor, or a torque generated by the electric servomotor, which exceeds an assigned kinematic or dynamic rotor size of the electric servomotor with the control device; and
- generating with the control device an event signal indicating that a kinematic or dynamic rotor size of the electric servomotor exceeds an assigned threshold value based upon the identification.

\* \* \* \* \*